(12) United States Patent
Sakuma et al.

(10) Patent No.: US 10,113,875 B2
(45) Date of Patent: *Oct. 30, 2018

(54) MODULE AND ELECTRONIC APPARATUS

(71) Applicant: Seiko Epson Corporation, Tokyo (JP)

(72) Inventors: Masayasu Sakuma, Kamiina (JP); Yoshihiro Kobayashi, Komagane (JP); Shojiro Kitamura, Suwa (JP); Taketo Chino, Hokuto (JP); Michiharu Ogami, Sakata (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,943

(22) Filed: Mar. 15, 2016

(65) Prior Publication Data

US 2016/0195396 A1 Jul. 7, 2016

Related U.S. Application Data

(63) Continuation of application No. 13/478,850, filed on May 23, 2012, now Pat. No. 9,316,499.

(30) Foreign Application Priority Data

May 31, 2011 (JP) .................................. 2011-122792

(51) Int. Cl.
*G01C 19/5783* (2012.01)
(52) U.S. Cl.
CPC ................................ *G01C 19/5783* (2013.01)
(58) Field of Classification Search
CPC ..................................................... G01P 1/023
USPC .......................................................... 73/493
See application file for complete search history.

(56) References Cited

U.S. PATENT DOCUMENTS

| 5,233,871 | A | 8/1993 | Schwarz et al. |
| 6,738,721 | B1 | 5/2004 | Drucke et al. |
| 7,040,922 | B2* | 5/2006 | Harney .................. G01C 21/16 361/810 |
| 7,291,023 | B1 | 11/2007 | Still et al. |

(Continued)

FOREIGN PATENT DOCUMENTS

| CN | 101109634 A | 1/2008 |
| CN | 101416302 A | 4/2009 |

(Continued)

OTHER PUBLICATIONS

English Machine Translation of JP7-306047 Retrieved Jan. 22, 2017.*

(Continued)

*Primary Examiner* — Paul West
*Assistant Examiner* — Mark A Shabman
(74) *Attorney, Agent, or Firm* — Harness, Dickey & Pierce, P.L.C.

(57) ABSTRACT

A module includes a first rigid substrate including an analog circuit; a second rigid substrate including a digital circuit; a third rigid substrate including an angular velocity sensor; a first connecting portion that connects the first rigid substrate and the second rigid substrate so as to electrically connect the analog circuit and the digital circuit, and that has flexibility; and a second connecting portion that connects the first rigid substrate and the third rigid substrate so as to electrically connect the analog circuit and the angular velocity sensor, and that has flexibility.

8 Claims, 11 Drawing Sheets

(56) References Cited

U.S. PATENT DOCUMENTS

| | | | |
|---|---|---|---|
| 7,625,245 B1* | 12/2009 | Yao | H01R 13/50 439/607.4 |
| 8,368,154 B2 | 2/2013 | Trusov et al. | |
| 8,605,919 B2 | 12/2013 | Awamura et al. | |
| 2003/0011980 A1 | 1/2003 | Albrecht et al. | |
| 2003/0070483 A1* | 4/2003 | Mueller | G01C 19/5783 73/493 |
| 2008/0100732 A1 | 5/2008 | Minamio et al. | |
| 2008/0117324 A1 | 5/2008 | Minamio et al. | |
| 2008/0144302 A1 | 6/2008 | Rosenblatt | |
| 2008/0152272 A1 | 6/2008 | Debrailly et al. | |
| 2009/0056446 A1 | 3/2009 | Cluff et al. | |
| 2009/0095510 A1 | 4/2009 | Ono et al. | |
| 2009/0255335 A1* | 10/2009 | Fly | G01C 19/5719 73/493 |
| 2009/0283891 A1 | 11/2009 | Dekker et al. | |
| 2009/0303204 A1* | 12/2009 | Nasiri | A63F 13/06 345/184 |
| 2009/0308157 A1 | 12/2009 | Eriksen et al. | |
| 2011/0053387 A1* | 3/2011 | Liu | G06F 1/185 439/55 |
| 2011/0077820 A1 | 3/2011 | Tokui et al. | |
| 2011/0110055 A1 | 5/2011 | Philips et al. | |
| 2011/0162452 A1 | 7/2011 | Ono et al. | |
| 2011/0297745 A1 | 12/2011 | Isuyama | |
| 2013/0111993 A1 | 5/2013 | Wang | |

FOREIGN PATENT DOCUMENTS

| | | |
|---|---|---|
| CN | 101532840 A | 9/2009 |
| CN | 102121829 A | 7/2011 |
| JP | 05-223839 | 9/1993 |
| JP | 05-340960 A | 12/1993 |
| JP | 07-306047 A | 11/1995 |
| JP | 11-211481 A | 8/1999 |
| JP | 11-281407 | 10/1999 |
| JP | 11-289141 A | 10/1999 |
| JP | 2001-102746 A | 4/2001 |
| JP | 2002-009228 A | 1/2002 |
| JP | 2003-107549 A | 4/2003 |
| JP | 2005-197493 A | 7/2005 |
| JP | 2007-057288 A | 3/2007 |
| JP | 2007-059701 A | 3/2007 |
| JP | 2010-192060 A | 9/2010 |
| JP | 2010-231895 A | 10/2010 |
| JP | 2011-075442 A | 4/2011 |
| WO | WO-2011-140804 A1 | 11/2011 |

OTHER PUBLICATIONS

J. Barton et al, "Design, Fabrication and Testing of Miniaturised Wireless Inertial Measurement Units (IMU)", 2007 Electronic Components and Technology Conference [pp. 1143-1148], Tyndall National Institute, Lee Maltings, Prospect Row, Cork, Ireland.

Extended European Search Report for Application No. 12 16 9761 dated Oct. 17, 2012 (5 pages).

U.S. Appl. No. 14/971,007, filed Dec. 16, 2015, Masayasu Sakuma, Module and Electronic Apparatus.

* cited by examiner

MODULE AND ELECTRONIC APPARATUS

CROSS-REFERENCE TO RELATED APPLICATIONS

This is a continuation application of U.S. application Ser. No. 13/478,850, filed May 23, 2012, which claims priority to Japanese Patent Application No. 2011-122792, filed May 31, 2011, both of which are expressly incorporated by reference herein in their entireties.

BACKGROUND

1. Technical Field

The present invention relates to a module and an electronic apparatus.

2. Related Art

For example, a posture angle detecting device provided with a gyro sensor as a sensor that detects a posture of an object or the like is disclosed (for example, refer to JP-A-11-211481). The posture angle detecting device disclosed in JP-A-11-211481 is configured by disposing three vibrators (gyro sensors) on a flexible substrate, and by bending the flexible substrate in a manner such that detection axes of the three vibrators are orthogonal to each other. In this manner, an angular velocity around the respective three axes that are orthogonal to each other may be detected.

However, in the posture angle detecting device, since the respective vibrators are disposed on the flexible substrate that is soft and has flexibility, there are the following problems. (1) The mounting of the vibrators is difficult, (2) it is difficult to make the vibrators have a desired posture, specifically, it is difficult to set detection axes of the vibrators in a state to be orthogonal to each other and to maintain this state, and the like.

SUMMARY

An advantage of some aspects of the invention is to provide a module in which the mounting of a sensor device is simple, and the sensor device may be set in a desired posture, and an electronic apparatus.

An aspect of the invention is directed to a module including: a first substrate that includes an analog circuit; a second substrate that includes a digital circuit; a third substrate that includes a first sensor device; a first connecting portion that connects the first substrate and the second substrate so as to electrically connect the analog circuit and the digital circuit, and that has flexibility; and a second connecting portion that connects the first substrate and the third substrate so as to electrically connect the analog circuit and the first sensor device, and that has flexibility.

According to this configuration, a module in which the mounting of a sensor device is simple and the sensor device may be set in a desired posture may be obtained. Specifically, by bend-deforming the second connecting portion, the posture of the sensor device with respect to the first substrate may be simply changed, and therefore the posture of the sensor device may be constantly maintained in a simple manner.

It is preferred that the module according to the aspect of the invention further includes: a fourth substrate that includes a second sensor device; and a third connecting portion that connects the first substrate and the fourth substrate, or the third substrate and the fourth substrate so as to electrically connect the analog circuit and the second sensor device, wherein the third connecting portion may have flexibility.

According to this configuration, the posture of the first sensor device and the second sensor device may be independently changed.

In the module according to the aspect of the invention, it is preferred that the first substrate further includes a third sensor device that is electrically connected to the analog circuit.

According to this configuration, the posture of the first sensor device, the second sensor device and the third sensor device may be independently changed.

In the module according to the aspect of the invention, it is preferred that the first substrate, the third substrate, and the fourth substrate are disposed to be orthogonal to each other.

According to this configuration, the first sensor device, the second sensor device, and the third sensor device may be set in a posture to be orthogonal to each other.

In the module according to the aspect of the invention, it is preferred that each of the first sensor device, the second sensor device, and the third sensor device is an acceleration sensor or an angular velocity sensor.

According to this configuration, an angular velocity or acceleration may be detected.

In the module according to the aspect of the invention, it is preferred that detection axes of the first sensor device, the second sensor device, and the third sensor device are orthogonal to each other.

According to this configuration, an angular velocity around the respective three axes that are orthogonal to each other may be detected.

In the module according to the aspect of the invention, it is preferred that the first substrate and the second substrate are opposite to each other.

According to this configuration, occurrence of noise may be suppressed in a relatively effective manner.

In the module according to the aspect of the invention, it is preferred that the third sensor device is positioned on a face that is opposite to the first substrate and the second substrate.

According to this configuration, an adverse effect of the noise from the digital circuit on the third sensor device may be suppressed.

It is preferred that the module according to the aspect of the invention further includes: a fifth substrate that includes a connector for an interface; and a fourth connecting portion that connects the second substrate and the fifth substrate so as to electrically connect the digital circuit and the connector.

According to this configuration, an input and an output of a signal may be easy.

In the module according to the aspect of the invention, it is preferred that at least one of the first substrate and the second substrate has a cut-out portion, and the connecting portion extends from the cut-out portion.

According to this configuration, the respective connection portions may be easily bending-deformed.

In the module according to the aspect of the invention, it is preferred that the analog circuit includes at least one of a power supply circuit, an amplifying circuit, and an analog/digital converting circuit, and the digital circuit includes a microcontroller.

According to this configuration, a signal detected by the sensor devices may be output in a simple and accurate manner.

It is preferred that the module according to the aspect of the invention further includes a supporting member that has a plurality of fixing faces, wherein the first substrate, the second substrate, and the third substrate are disposed along the fixing faces, respectively.

According to this configuration, the posture of the sensor devices may be maintained in a simple manner.

Another aspect of the invention is directed to an electronic apparatus including the module according to the above-described aspect of the invention.

According to this configuration, an electronic apparatus excellent in reliability may be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a module and an electronic apparatus of the invention will be described in detail with reference to preferred embodiments shown in the attached drawings.

1. Module

First Embodiment

First, a first embodiment of a module of the invention will be described.

Figure 1A:
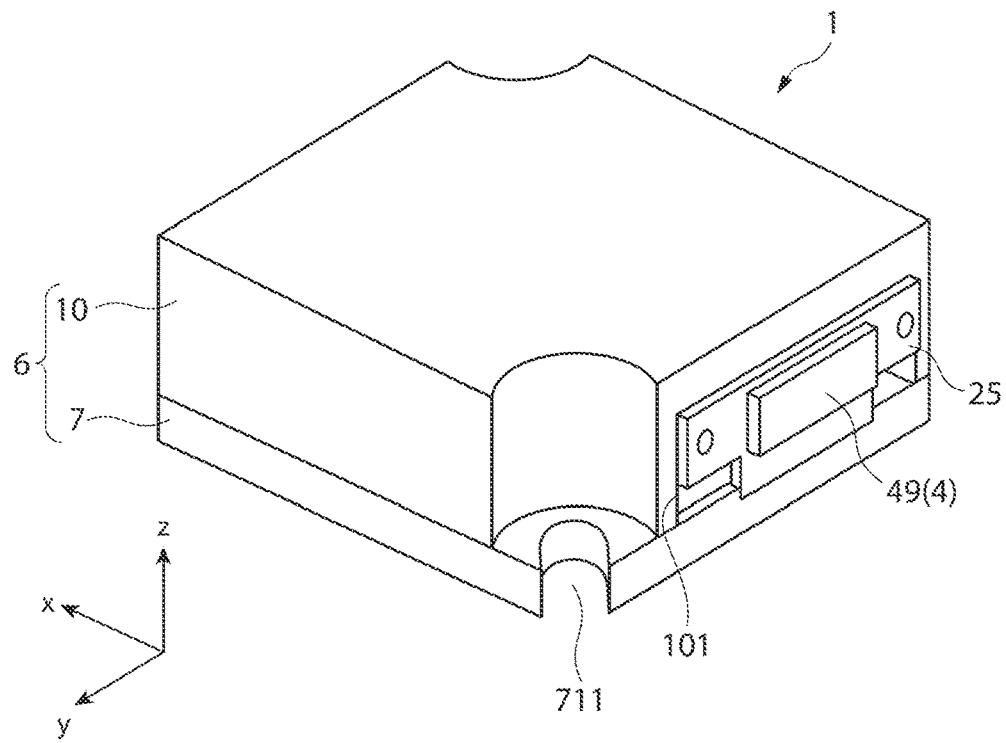
FIGS. 1A and 1B are perspective views illustrating a first embodiment of a module according to the invention.
Figure 1B:
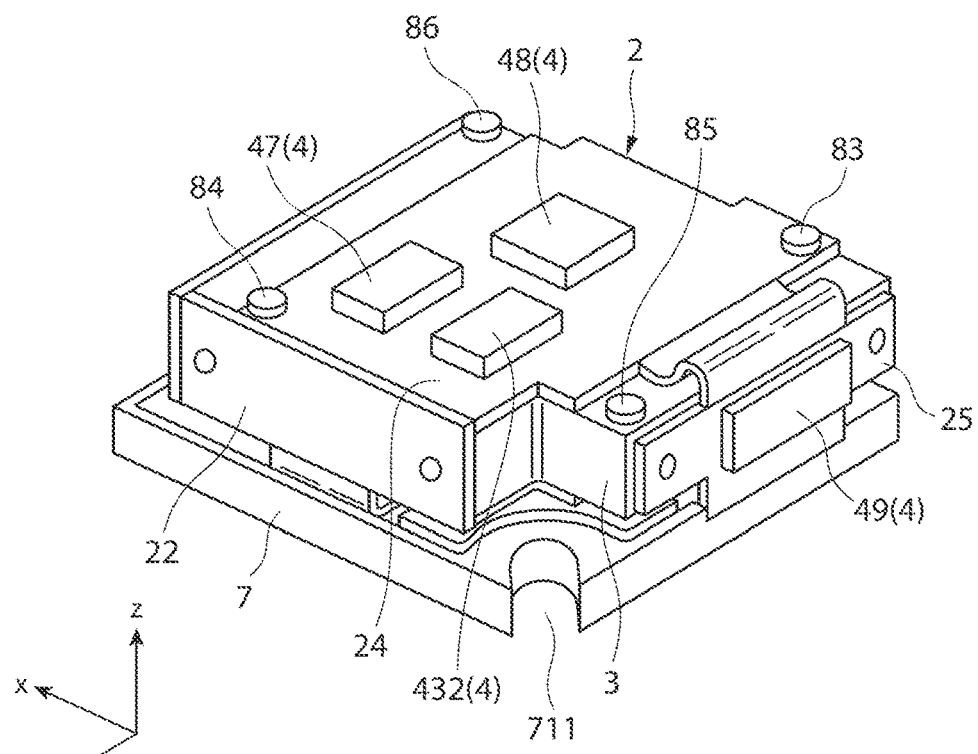
Figure 2A:
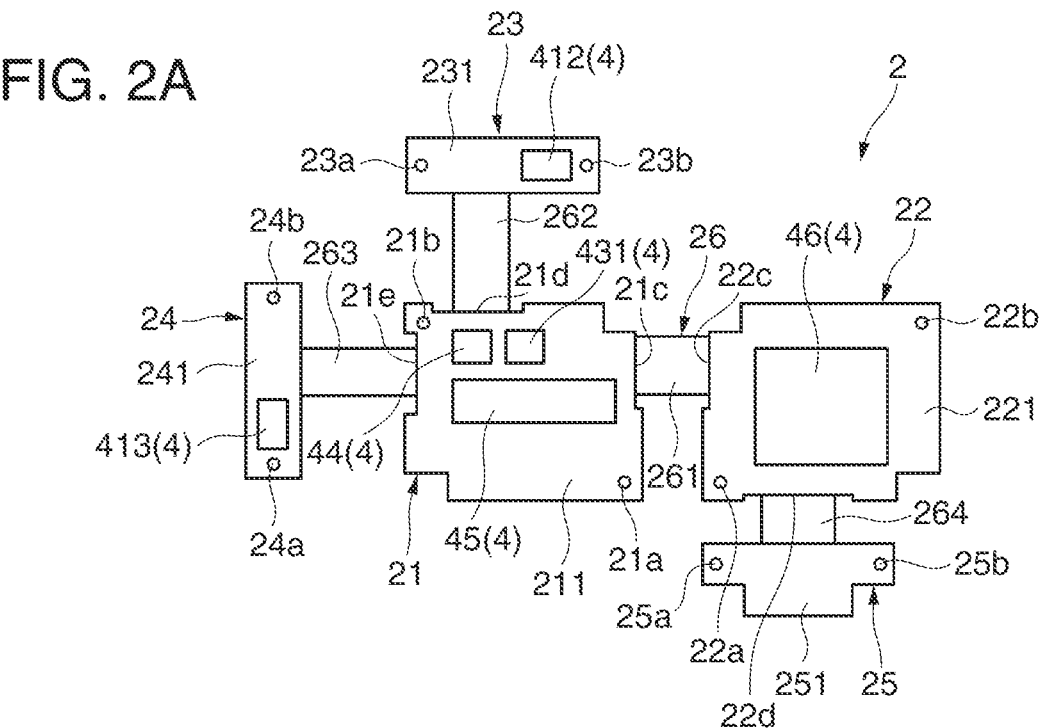
FIGS. 2A and 2B are development views of a circuit board provided in the module shown in FIGS. 1A and 1B.
Figure 2B:
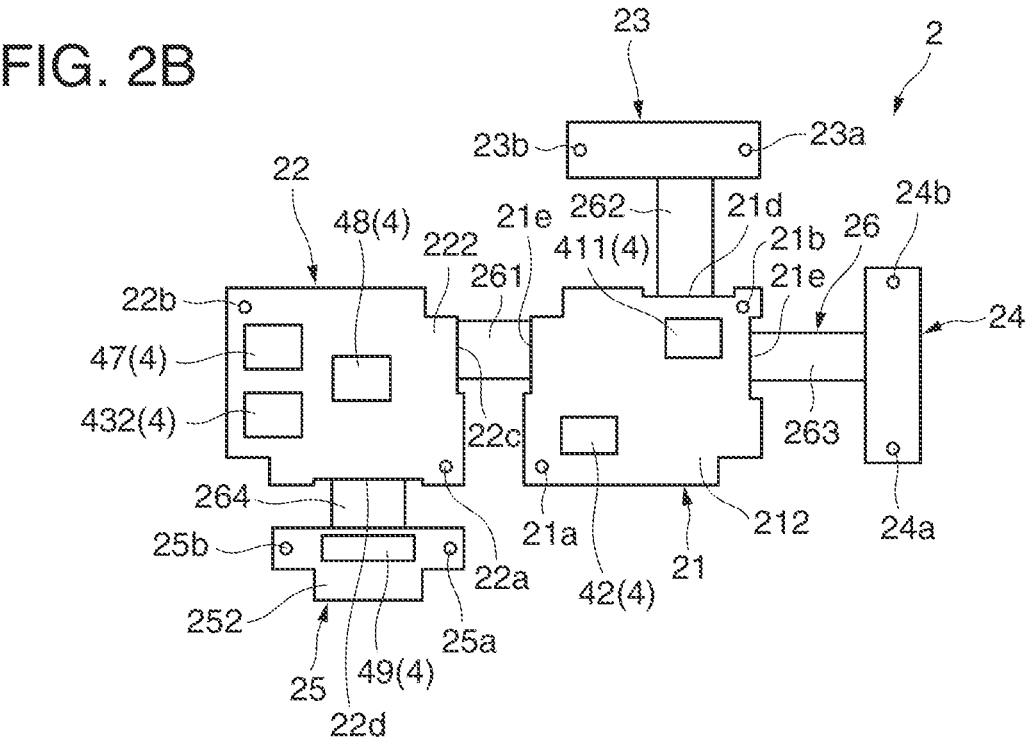
Figure 3:
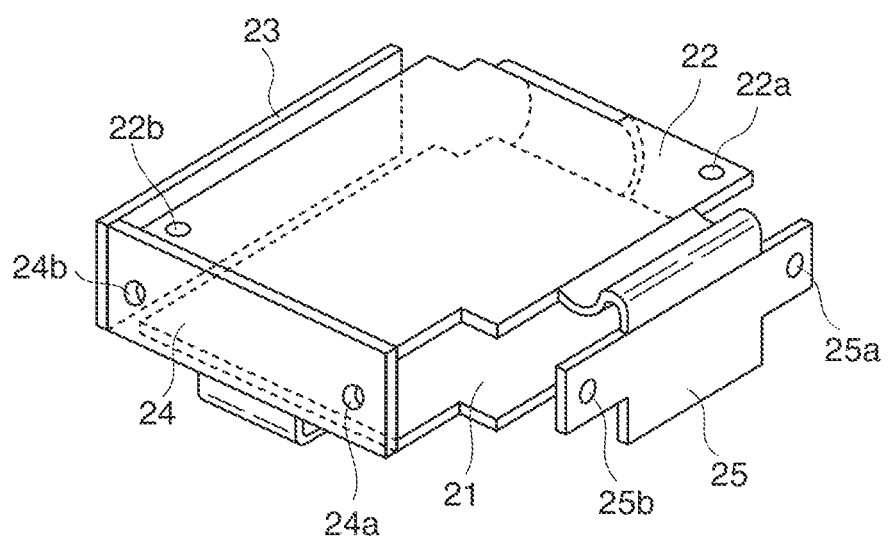
FIG. 3 is a perspective view illustrating a state in which the circuit board shown in FIGS. 2A and 2B is assembled.
Figure 4:
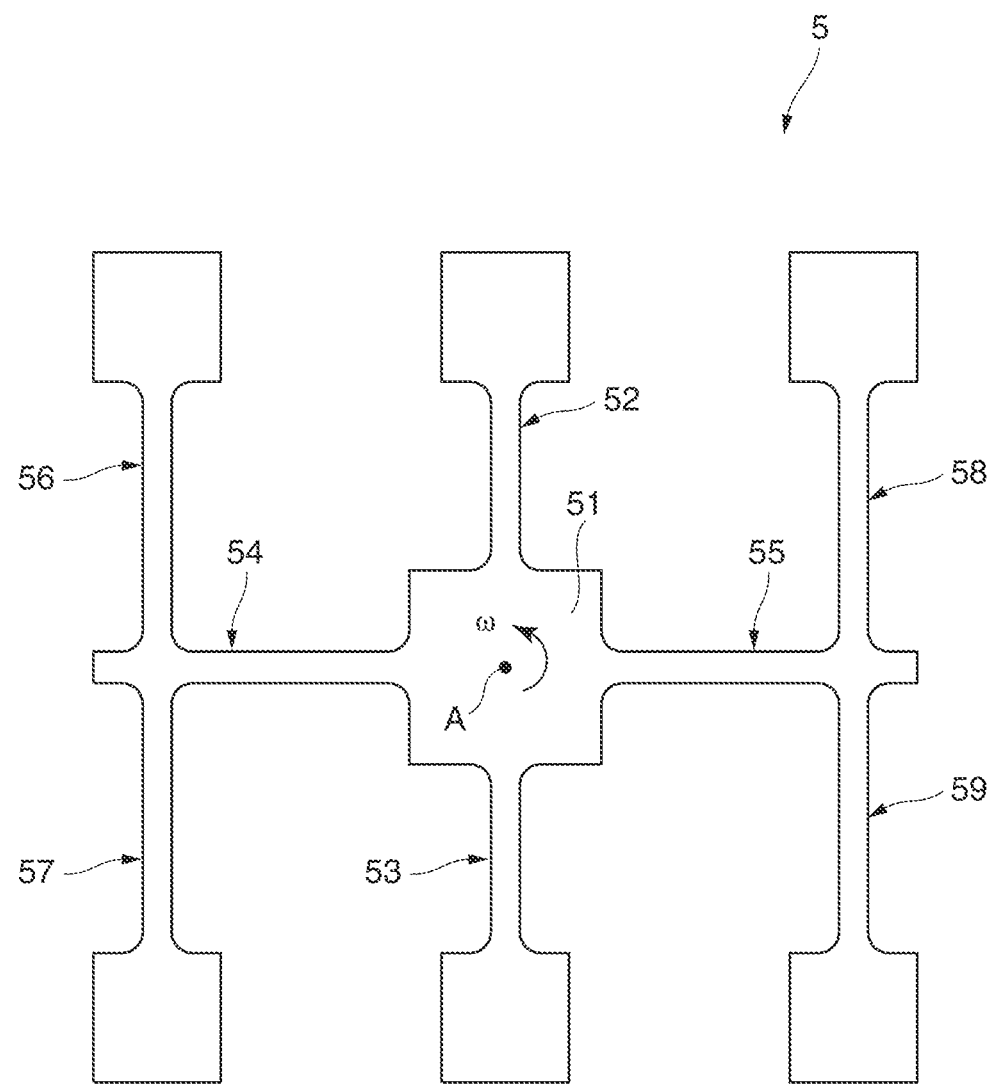
FIG. 4 is a plan view illustrating an example of an angular velocity sensor provided in the module shown in FIGS. 1A and 1B.
Figure 5A:
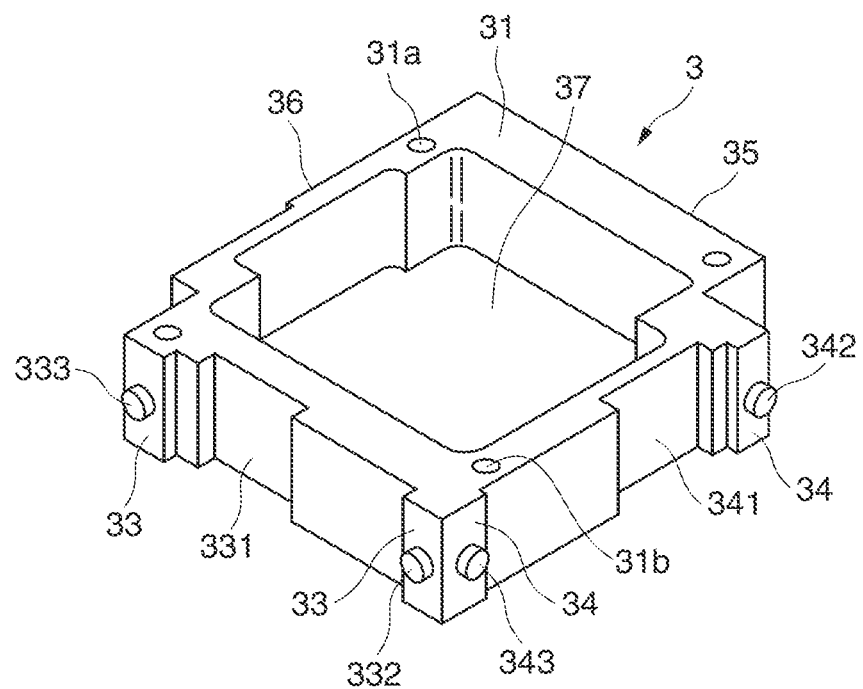
FIGS. 5A and 5B are perspective views illustrating a supporting member provided in the module shown in FIGS. 1A and 1B.
Figure 5B:
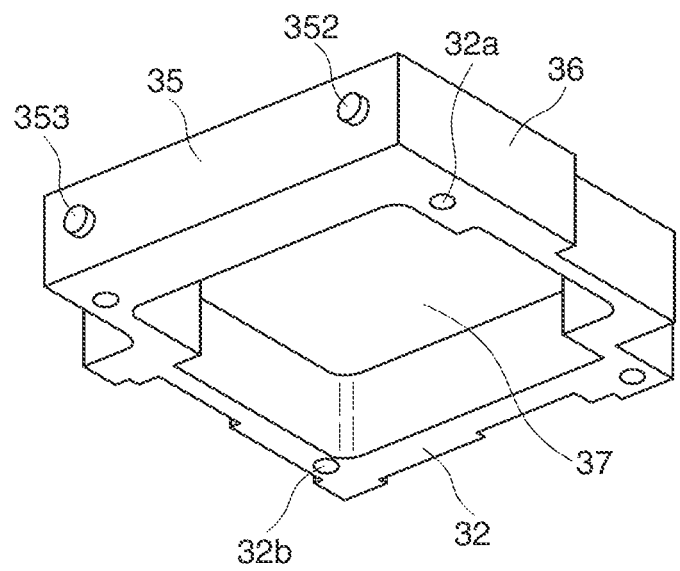
Figure 6:
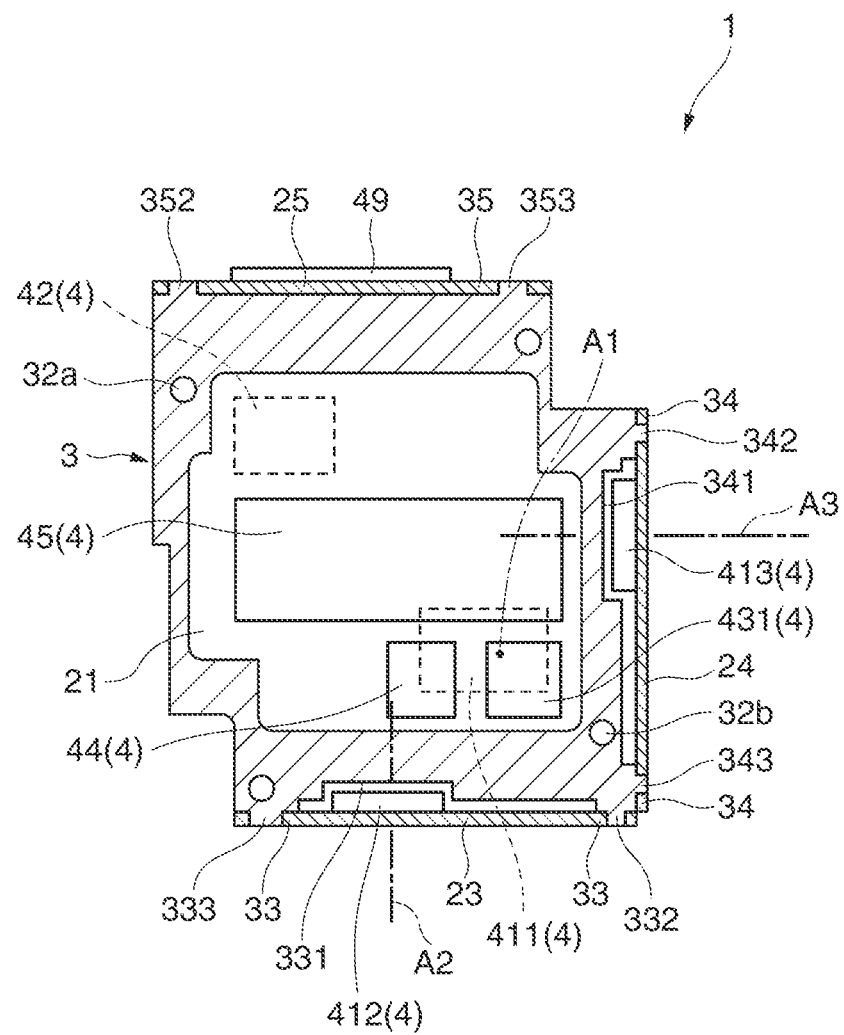
FIG. 6 is a transverse cross-sectional view illustrating the supporting member to which the circuit board is fixed.
Figure 7A:
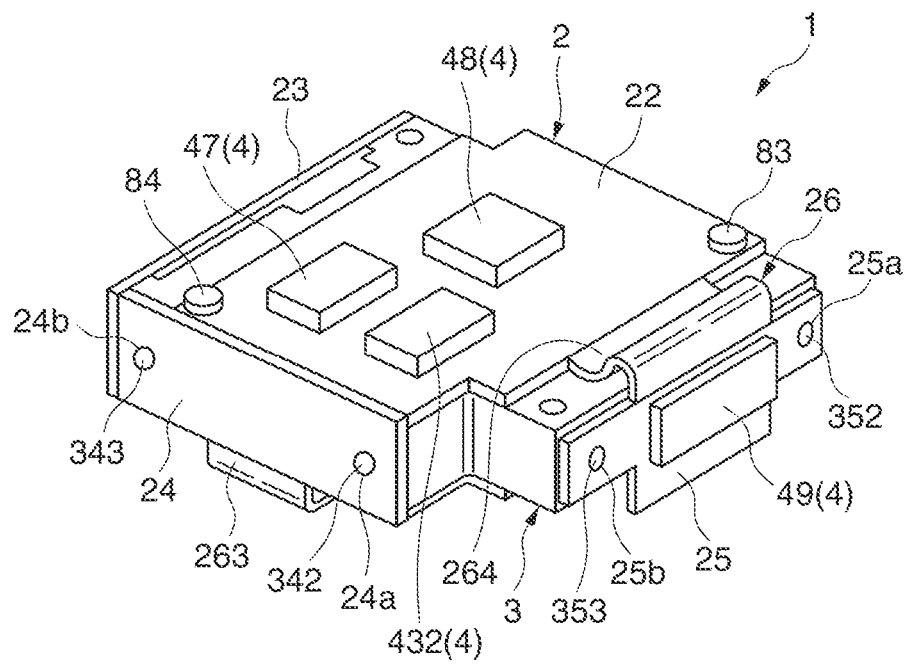
FIGS. 7A and 7B are perspective views illustrating the supporting member to which the circuit board is fixed.
Figure 7B:
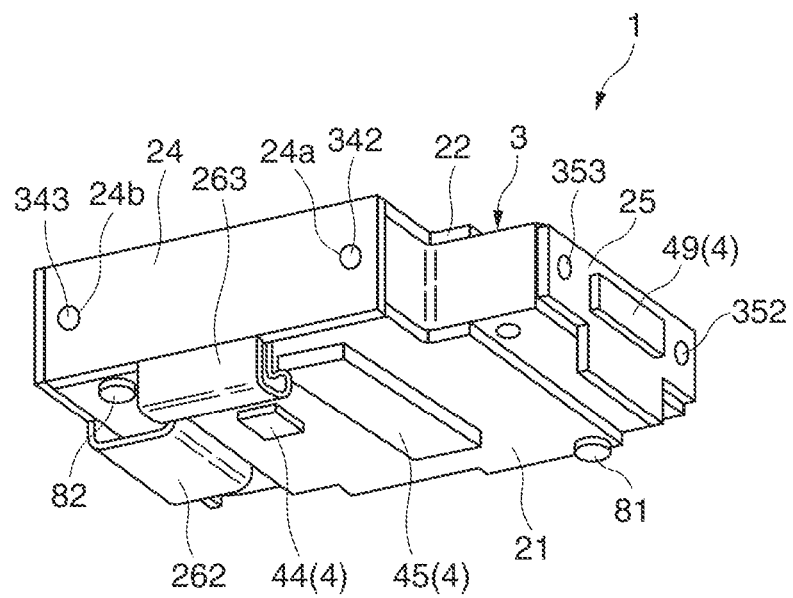
Figure 8:
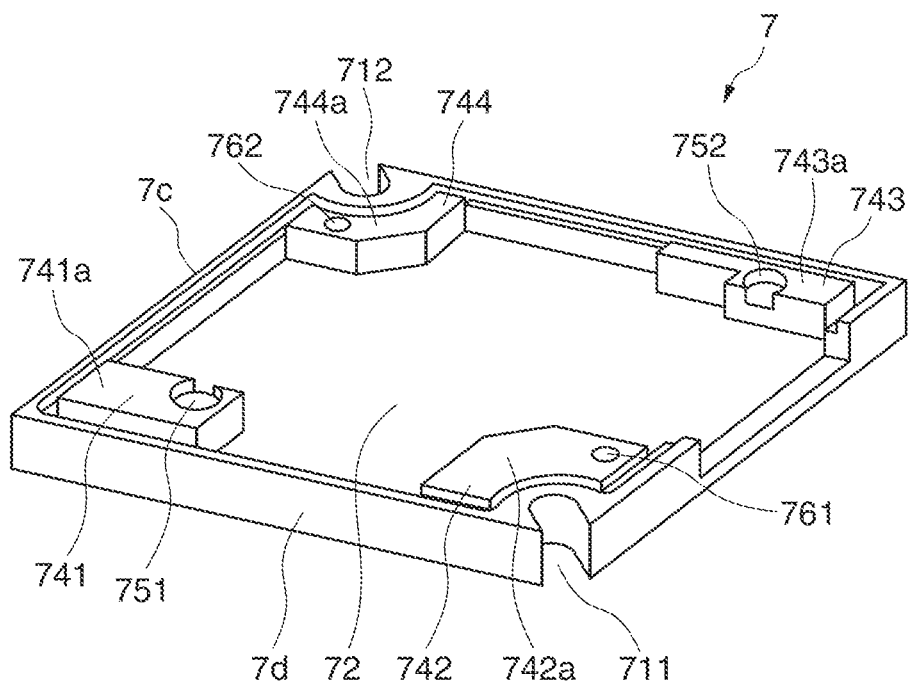
FIG. 8 is a perspective view illustrating a base provided in the module shown in FIGS. 1A and 1B.
Figure 8:
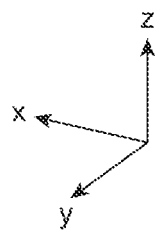

FIGS. 1A and 1B show perspective views illustrating a first embodiment of a module according to the invention, FIGS. 2A and 2B show development views of a circuit board provided to the module shown in FIGS. 1A and 1B, FIG. 3 shows a perspective view illustrating a state in which the circuit board shown in FIGS. 2A and 2B is assembled, FIG. 4 shows a plan view illustrating an example of an angular velocity sensor provided to the module shown in FIGS. 1A and 1B, FIGS. 5A and 5B show perspective views illustrating a supporting member provided to the module shown in FIGS. 1A and 1B, FIG. 6 shows a transverse cross-sectional view illustrating the supporting member to which the circuit board is fixed, FIGS. 7A and 7B show perspective views illustrating the supporting member to which the circuit board is fixed, FIG. 8 shows a perspective view illustrating a base provided to the module shown in FIGS. 1A and 1B, and FIGS. 9A and 9B show a plan view illustrating the supporting member shown in FIGS. 5A and 5B and the base shown in FIG. 8.

In addition, in FIGS. 1A and 1B, the upper side in the drawings is described as "up", and the lower side in the drawings is described as "down" in the following description for convenience of description. In addition, as shown in FIGS. 1A and 1B, three axes which are orthogonal to each other are referred to as the "x-axis", "y-axis", and "z-axis". The z-axis is an axis parallel to a normal line direction of a base 7, the x-axis is an axis parallel to the extension direction of a pair of sides of the base 7, which are opposite to each other, in plan view of the base 7, and the y-axis is an axis parallel to the extension direction of another pair of sides of the base 7, which are opposite to each other.

The module 1 shown in FIGS. 1A and 1B includes angular velocity sensors 411 to 413, and is a three-axis gyro sensor module that is capable of detecting the angular velocity around the x-axis, the y-axis, and the z-axis that are orthogonal to each other. This module 1 is excellent in convenience and may be appropriately used for, for example, motion tracing, motion tracking, a motion controller, a pedestrian dead reckoning (PDR), or the like.

As shown in FIGS. 1A and 1B, the module 1 includes an electronic component 4, a mounting substrate 2 on which the electronic component 4 is mounted, a supporting member 3 that supports and fixes the mounting substrate 2, and a casing 6 that maintains the supporting member 3. In addition, a cover member 10 of the module 1 shown in FIG. 1A is not shown in FIG. 1B.

Hereinafter, these members are sequentially described.

Mounting Substrate 2

The mounting substrate 2 is a rigid and flexible substrate in which a rigid substrate, which is hard and therefore difficult to deform, and a flexible substrate, which is soft and therefore easy to deform, are combined. As this mounting substrate 2, for example, a known rigid and flexible substrate in which a hard layer such as a glass epoxy substrate is adhered to both sides of a flexible substrate and this hard layer is used as the rigid substrate may be used.

Here, FIG. 2A shows a plan view taken when a developed mounting substrate 2 is seen from one face side thereof, and FIG. 2B shows a plan view taken when the developed mounting substrate 2 is seen from a face side opposite to FIG. 2A. As shown in FIGS. 2A and 2B, the mounting substrate 2 includes a first rigid substrate (a first substrate) 21, a second rigid substrate (a second substrate) 22, a third rigid substrate (a third substrate) 23, a fourth rigid substrate (a fourth substrate) 24, and a fifth rigid substrate (a fifth substrate) 25 that are disposed to be spaced from each other, and a flexible substrate 26 that connects these substrates.

The flexible substrate 26 includes a first connecting portion 261 that connects the first rigid substrate 21 and the second rigid substrate 22, a second connecting portion 262 that connects the first rigid substrate 21 and the third rigid substrate 23, a third connecting portion 263 that connects the first rigid substrate 21 and the fourth rigid substrate 24, and a fourth connection portion 264 that connects the second rigid substrate 22 and the fifth rigid substrate 25. The first connecting portion 261, the second connecting portion 262, the third connecting portion 263, and the fourth connection portion 264 have flexibility, respectively, and therefore bending deformation may be easily performed in a face direction.

In addition, hole portions 21a and 21b are formed at both ends of the first rigid substrate 21, respectively, hole portions 22a and 22b are formed at both ends of the second rigid substrate 22, respectively, hole portions 23a and 23b are formed at both ends (both corner portions that are in a diagonal relationship) of the third rigid substrate 23, respectively, hole portions 24a and 24b are formed at both ends (both corner portions that are in a diagonal relationship) of the fourth rigid substrate 24, respectively, hole portions 25a and 25b are formed at both ends of the fifth rigid substrate 25, respectively. These hole portions 21a to 25b are used to fix the first to fifth rigid substrates 21 to 25 to the supporting member 3. In addition, the hole portions include both a structure that penetrates from one face to another face, and a structure in which an opening is provided on one face and which does not penetrate to another face.

The mounting substrate 2 may be deformed into a rectangular parallelepiped shape shown in FIG. 3 by bending (curving) the respective connecting portions 261 to 264 of the flexible substrate 26. Specifically, when the connecting portions 261 to 264 are bent in a manner such that the front-side mounting faces 211 to 251 of the respective rigid substrates 21 to 25 face an inner side, the mounting substrate 2 may be deformed into a rectangular parallelepiped shape in which adjacent rigid substrates are orthogonal to each other. In this state, the first rigid substrate 21 makes up a bottom face, the second rigid substrate 22 makes up a top face, and the third, the fourth, and the fifth rigid substrates 23, 24, and 25 make up side faces. As shown in FIGS. 1A and 1B, the mounting substrate 2 is supported by and fixed to the supporting member 3 in this deformed state. In other words, the mounting substrate 2 is designed so as to be deformed into a shape corresponding to the supporting member 3.

In this manner, when the mounting substrate 2 is configured with a rigid and flexible substrate, since the mounting substrate 2 may be easily deformed, the fixing of the mounting substrate 2 to the supporting member 3 becomes simple. In addition, since the respective rigid substrates 21 to 25 are collectively connected by the connecting portions 261 to 264, in this regard, the fixing of the mounting substrate 2 to the supporting member 3 may be performed in a simple and smooth manner. In addition, the plurality of rigid substrates is provided, such that the degree of freedom in arrangement of the electronic components 4 increases.

In addition, the electronic components 4 are mounted on the hard rigid substrates, such that unnecessary vibration of the electronic components 4 (particularly, angular velocity sensors 411 to 413) may be suppressed, and therefore detection accuracy of the module 1 is improved. In addition, the electronic components 4 may be easily mounted on the mounting substrate 2. In addition, a degree of parallelization of the electronic components 4 may be easily obtained, and particularly, the angular velocity sensors 411 to 413 may be simply set in a desired posture, and the posture may be maintained. In addition, when the electronic components 4 are mounted on the rigid substrates, the electronic components 4 may be mounted with high accuracy.

Particularly, in this embodiment, the first rigid substrate 21 has a first cut-out portion 21c, a second cut-out portion 21d, and a third cut-out portion 21e that are opened toward an edge (an outer periphery) thereof. The first cut-out portion 21c is formed with a step difference with respect to a right side of the first rigid substrate 21 in FIG. 2A, and the first connecting portion 261 extends from the first cut-out portion 21c. Similarly, the second cut-out portion 21d is formed with a step difference with respect to an upper side of the first rigid substrate 21 in FIG. 2A, and the second connecting portion 262 extends from the second cut-out portion 21d. In addition, the third cut-out portion 21e is formed with a step difference with respect to a left side of the first rigid substrate 21 in FIG. 2A, and the third connecting portion 263 extends from the third cut-out portion 21e.

When the first cut-out portion 21c is formed in the first rigid substrate 21, the first connecting portion 261 may be simply bending-deformed in the vicinity of a connecting portion with the first rigid substrate 21 (relatively on the first rigid substrate 21 side), and a radius of curvature at the time of bending deformation may be maintained to be relatively large. In addition, excessive protrusion of a bent portion from an outer periphery of the first rigid substrate 21 is suppressed and therefore in regard to the module 1, a reduction in size may be promoted. In addition, in regard to the second cut-out portion 21d and the third cut-out portion 21e, the same effect may be obtained.

In addition, in this embodiment, the second rigid substrate 22 has a fourth cut-out portion 22c and a fifth cut-out portion 22d that are opened to an edge (outer periphery) thereof. The fourth cut-out portion 22c is formed with a step difference with respect to a left side of the second rigid substrate 22 in FIG. 2A, and the first connecting portion 261 extends from the fourth cut-out portion 22c. Similarly, the fifth cut-out portion 22d is formed with a step difference with respect to a lower side of the second rigid substrate 22 in FIG. 2A, and the fourth connection portion 264 extends from the fifth cut-out portion 22d.

When the fourth cut-out portion 22c is formed in the second rigid substrate 22, the first connecting portion 261 may be simply bending-deformed in the vicinity of a connecting portion with the second rigid substrate 22 (relatively on the second rigid substrate 22 side), and a radius of curvature at the time of bending deformation may be maintained to be relatively large. In addition, excessive protrusion of a bent portion from an outer periphery of the second rigid substrate 22 is suppressed and therefore in regard to the module 1, a reduction in size may be promoted. In addition, in regard to the fifth cut-out portion 22d, the same effect may be obtained.

Hereinbefore, a description has been made with respect to the mounting substrate 2. In addition, conductor patterns (not shown) are formed in the respective rigid substrates 21 to 25 and the flexible substrate 26 of the mounting substrate 2, and the plurality of electronic components 4 are electrically connected through the conductor patterns in an appropriate manner. Hereinafter, for easy description, faces of the respective rigid substrates 21 to 25, which are shown in FIG. 2A, are referred to as "frond-side mounting faces", and faces shown in FIG. 2B are referred to as "rear-side mounting faces".

In addition, in the mounting substrate 2, a ground layer (not shown) is formed, and this ground layer exhibits a function of interrupting an external magnetic field. Therefore, in a state shown in FIG. 3, in regard to the electronic components 4 positioned at an inner side of the mounting substrate 2 (that is, electronic components 4 that are mounted on the front-side mounting faces 211 to 251), an effect due to an external magnetic field (exogenous noise) from the outside of the module 1 may be excluded.

Electronic Components 4

As shown in FIGS. 2A and 2B, the plurality of electronic components 4 are mounted on the mounting substrate 2.

As the electronic components 4, three one-axis detection type angular velocity sensors 411 to 413, a three-axis detection type acceleration sensor 42, a first power supply circuit 431 and a second power supply circuit 432 that drives various electronic components, an amplifying circuit 44 that amplifies an output signal from the sensors 411 to 413 and 42, an analog/digital converting circuit 45 that converts an analog signal, which is amplified by the amplifying circuit 44, to a digital signal, a microcontroller 46 that performs a desired control, a nonvolatile memory 47 such as an EEPROM, an orientation sensor (magnetic sensor) 48 that detects orientation, and a connector 49 for an interface are mounted on the mounting substrate 2. In addition, here, as the acceleration sensor 42, a sensor having a three-axis detecting structure with one device is used, but similarly to the angular velocity sensor, three one-axis detection type acceleration sensors may be used.

Hereinafter, disposition of these electronic components 4 will be described in detail.

First Rigid Substrate 21

The first power supply circuit 431, the amplifying circuit 44, and the analog/digital converting circuit 45 are mounted on a front-side mounting face 211 of the first rigid substrate 21, and the angular velocity sensor (first sensor device) 411 that detects an angular velocity around the z-axis, and the acceleration sensor 42 are mounted on a rear-side mounting face 212. In addition, the angular velocity sensor 411 and the acceleration sensor 42 may be mounted on the front-side mounting face 211, and the first power supply circuit 431, the amplifying circuit 44, and the analog/digital converting circuit 45 may be mounted on the rear-side mounting face 212.

The analog/digital converting circuit 45 has a size larger than that of other electronic components 4 (the first power supply circuit 431 and the amplifying circuit 44) that are mounted on the front-side mounting face 211. Therefore, it is preferable that the analog/digital converting circuit 45 be disposed at a central portion of the front-side mounting face 211. Due to this configuration, the analog/digital converting circuit 45 may be effectively used as a reinforcing member that augments the strength of the first rigid substrate 21. Therefore, unintended vibration caused by bending deformation of the first rigid substrate 21 is suppressed, and therefore unnecessary vibration is not transmitted to the angular velocity sensors 411 to 413, and angular velocity detection accuracy by the angular velocity sensors 411 to 413 (particularly, the angular velocity sensor 411 mounted on the first rigid substrate 21) is raised.

In addition, it is preferable that the angular velocity sensor 411 and the acceleration sensor 42 be disposed at an edge portion of the rear-side mounting face 212 (particularly, in the vicinity of either the hole portion 21a or the hole portion 21b). As described later, the first rigid substrate 21 is fixed to the supporting member 3 by being screw-coupled thereto with the hole portions 21a and 21b interposed therebetween. As a result, the vicinity of the hole portions 21a and 21b (the edge portion of the first rigid substrate 21) is difficult to deform and unnecessary vibration hardly occurs. Therefore, when the angular velocity sensor 411 and the acceleration sensor 42 are disposed at this place, the angular velocity and the acceleration may be detected with relatively high accuracy.

In addition, when the angular velocity sensor 411 and the acceleration sensor 42 are mounted on the rear-side mounting face 212, the distance from the microcontroller 46 may further increase in a state in which the mounting substrate 2 is fixed to the supporting member 3. In addition, a ground layer of the first rigid substrate 21 may be positioned between the angular velocity sensor 411 and the acceleration sensor 42, and the microcontroller 46. Therefore, it is possible to prevent radiation noise generated from the microcontroller 46 from having an adverse effect on the angular velocity sensor 411 and the acceleration sensor 42, and therefore the detection accuracy of the angular velocity sensor 411 and the acceleration sensor 42 may be improved.

Second Rigid Substrate 22

The microcontroller 46 is mounted on a front-side mounting face 221 of the second rigid substrate 22, and the second power supply circuit 432 that activates the microcontroller 46, the non-volatile memory 47 that stores data, and the orientation sensor 48 are mounted on a rear-side mounting face 222.

The microcontroller 46 has a size larger than that of other electronic components 4 (the nonvolatile memory 47 and the orientation sensor 48) mounted on the second rigid substrate 22. Therefore, it is preferable that the microcontroller 46 be disposed at a central portion of the front-side mounting face 221. Due to this configuration, the microcontroller 46 may be effectively used as a reinforcing member that augments the strength of the second rigid substrate 22. Therefore, unnecessary vibration caused by bending deformation of the second rigid substrate 22 is suppressed, and therefore unnecessary vibration is not transmitted to the angular velocity sensors 411 to 413, and angular velocity detection accuracy by the angular velocity sensors 411 to 413 is raised.

In addition, radiation noise generated from the microcontroller 46 is blocked by the ground layer of the second rigid substrate 22, such that when the orientation sensor 48 is mounted on a mounting face that is opposite to the microcontroller 46, it is possible to effectively prevent the radiation noise (magnetic field) from reaching the orientation sensor 48 and having an adverse effect on the orientation sensor 48. Therefore, the detection accuracy of the orientation sensor 48 may be improved.

Third Rigid Substrate 23

The angular velocity sensor (second sensor device) 412 that detects an angular velocity around the x-axis is mounted on a front-side mounting face 231 of the third rigid substrate 23.

Fourth Rigid Substrate 24

The angular velocity sensor (third sensor device) 413 that detects an angular velocity around the y-axis is mounted on a front-side mounting face 241 of the fourth rigid substrate 24.

Fifth Rigid Substrate 25

The connector 49 for an interface is mounted on a rear-side mounting face 252 of the fifth rigid substrate 25. According to this configuration, an output of a signal, or an input of a signal such as a temperature correction coefficient may be performed in a simple manner.

Hereinbefore, a description has been made in detail with respect to the arrangement of the electronic components 4.

In the mounting substrate 2, analog circuits including the first power supply circuit 431, the amplifying circuit 44, the analog/digital converting circuit 45 are provided in the first rigid substrate 21, and a digital circuit including the microcontroller 46 is provided in the second rigid substrate 22. In this manner, when the analog circuits and the digital circuit are formed in substrates different from each other, Therefore, the propagation of high-frequency noise generated due to the digital circuit into the analog circuits may be suppressed and therefore excellent reliability and detection accuracy may be exhibited.

In addition, in this embodiment, a power supply for the analog circuits and a power supply for the digital circuit are separately prepared. That is, as the power supply for the analog circuits, the first power supply circuit 431 is provided, and as the power supply for the digital circuit, the second power supply circuit 432 is provided. In addition, in regard to the ground layer, a ground layer for the analog circuit and a ground layer for the digital circuit are provided separately. According to this configuration, the generation of the noise may be suppressed in a relatively effective manner, and therefore the detection accuracy of the module 1 is further raised.

The angular velocity sensors 411 to 413 are not particularly limited as long as the angular velocity may be detected, and a known one-axis detection type angular velocity sensor may be used. As these angular velocity sensors 411 to 413, for example, a sensor provided with a vibrating piece 5 shown in FIG. 4 may be used.

The vibrating piece 5 is formed of quartz (piezoelectric material). In addition, the vibrating piece 5 has a base portion 51, a pair of vibrating arms 52 and 53 for detection, which extends in the vertical direction on a plane of paper from both sides of the base portion 51, a pair of connecting arms 54 and 55 that extends in the horizontal direction on the plane of paper from both sides of the base portion 51, and respective pairs of vibrating arms 56, 57, 58, and 59 for driving, which extends in the vertical direction on the plane of paper from both sides of distal ends of the respective connecting arms 54 and 55. In addition, a detection electrode (not shown) is formed on a surface of each of the vibrating arms 52 and 53 for detection, and a driving electrode (not shown) is formed on a surface of each of the vibrating arms 56, 57, 58, and 59 for driving.

In this vibrating piece 5, in a state in which when a voltage is applied to the driving electrode and thereby the vibrating arms 56 and 58 for driving and the vibrating arms 57 and 59 for driving are made to vibrate so as to repeat approaching and separation from each other, when an angular velocity ω around a normal line A of the vibrating piece 5 is applied, a Coriolis force is applied to the vibrating piece 5 and the vibration of the vibrating arms 52 and 53 for detection is excited. In addition, the angular velocity applied to the vibrating piece 5 may be obtained by detecting strain of the vibrating arms 52 and 53 for detection, which is generated due to vibration of the vibrating arms 52 and 53 for detection, using the detection electrode.

Supporting Member

As shown in FIGS. 5A and 5B and FIG. 6, the supporting member 3 has a substantially rectangular parallelepiped shape, and has a top face 31 and a bottom face 32 disposed to be opposite to each other, and four side faces 33, 34, 35, and 36 that connect the top face 31 and the bottom face 32. In this supporting member 3, at least the two adjacent side faces, and the top face 31 or the bottom face 32 are formed with good accuracy so as to be orthogonal to each other. In addition, in this embodiment, all of the faces that are adjacent to each other are formed with good accuracy in a manner such that all of the adjacent faces are orthogonal to each other.

The bottom face 32, and the side faces 33 and 34 are faces to fix the first, third, and fourth rigid substrates 21, 23, and 24 on which the angular velocity sensors 411 to 413 are mounted as described later. Therefore, when these three faces are formed so as to be orthogonal to each other, the angular velocity sensors 411 to 413 may be accurately disposed in a posture in which respective detection axes A1 to A3 are orthogonal to each other. As a result, according to this module 1, the angular velocity around the respective axes (x-axis, y-axis, and z-axis) may be detected with high accuracy.

Side Face 33

The side face 33 makes up a fixing face that fixes the third rigid substrate 23. The third rigid substrate 23 is fixed to the side face 33 in a state in which the front-side mounting face 231 faces the supporting member 3 side (inner side). Specifically, the supporting member 3 has two protrusions 332 and 333 that protrude from both ends of the side face 33, and the hole portions 23a and 23b formed in the third rigid substrate 23 engage with the protrusions 332 and 333. Therefore, the third rigid substrate 23 is fixed to the side face 33 as shown in FIGS. 7A and 7B.

In this manner, by using two protrusions 332 and 333, the third rigid substrate 23 may be fixed to the side face 33 while performing positioning of the third rigid substrate 23 with respect to the side face 33. Particularly, when the protrusions 332 and 333 are formed on both ends of the side face 33, a spaced distance between the protrusions 332 and 333 is lengthened, and therefore the positioning of the third rigid substrate 23 may be performed with good accuracy.

It is preferable that in the fixing of the third rigid substrate 23 to the side face 33, adhesion using an adhesive also be used. Due to this configuration, the third rigid substrate 23 may be strongly fixed to the side face 33. This is true of other rigid substrates 21, 22, 24, and 25 described later.

In addition, the supporting member 3 has a concave portion 331 that is opened in the side face 33. This concave portion 331 is formed in accordance with a position and an exterior appearance of the angular velocity sensor 412, and in a state in which the third rigid substrate 23 is fixed to the side face 33, the angular velocity sensor 412 is accommodated in the concave portion 331. That is, the concave portion 331 makes up a relief portion that prevents the supporting member 3 and the angular velocity sensor 412 from being brought into contact with each other. When this concave portion 331 is formed, an inner space of the supporting member 3 may be effectively utilized and therefore the reduction in size of the module 1 may be promoted.

In addition, a zenith face (face opposite to a face that is mounted on the first rigid substrate 21) of the angular velocity sensor 412 and a surface of the concave portion 331 of the supporting member may be bonded with adhesive or the like. According to this configuration, the sensor device and the supporting member may be strongly bonded to each other.

Side Face 34

The side face 34 makes up a fixing face that fixes the fourth rigid substrate 24. The fourth rigid substrate 24 is fixed to the side face 34 in a state in which the front-side mounting face 241 faces the supporting member 3 side (an inner side). Specifically, the supporting member 3 has two protrusions 342 and 343 that protrude from both ends of the side face 34, and the hole portions 24a and 24b formed in the fourth rigid substrate 24 engage with the protrusions 342 and 343. Therefore, as shown in FIGS. 7A and 7B, the fourth rigid substrate 24 is fixed to the side face 34.

In addition, the supporting member 3 has a concave portion 341 that is opened in the side face 34. This concave portion 341 is formed in accordance with a position and an exterior appearance of the angular velocity sensor 413, and in a state in which the fourth rigid substrate 24 is fixed to the side face 34, the angular velocity sensor 413 is accommodated in the concave portion 341. That is, the concave portion 341 makes up a relief portion that prevents the supporting member 3 and the angular velocity sensor 413 from being brought into contact with each other. When this concave portion 341 is formed, an inner space of the supporting member 3 may be effectively utilized and therefore the reduction in size of the module 1 may be promoted.

In addition, a zenith face (face opposite to a face that is mounted on the second rigid substrate 22) of the angular velocity sensor 413 and a surface of the concave portion 341 of the supporting member may be bonded with adhesive or the like. According to this configuration, the sensor device and the supporting member may be strongly bonded to each other.

Side Face 35

The side face 35 makes up a fixing face that fixes the fifth rigid substrate 25. The fifth rigid substrate 25 is fixed to the side face 35 in a state in which the front-side mounting face 251 faces the supporting member 3 side (an inner side). That is, the fifth rigid substrate 25 is fixed to the side face 35 in a state in which the connector 49 is exposed to the outside of the module 1. Specifically, the supporting member 3 has two protrusions 352 and 353 that protrude from both ends of the side face 35. The hole portions 25a and 25b formed in the fifth rigid substrate 25 engage with the protrusions 352 and 353. Therefore, as shown in FIGS. 7A and 7B, the fifth rigid substrate 25 is fixed to the side face 35.

Bottom Face 32

The bottom face 32 makes up a fixing face that fixes the first rigid substrate 21. The first rigid substrate 21 is fixed to the bottom face 32 in a state in which the front-side mounting face 211 faces the supporting member 3 side (inner side). Specifically, the supporting member 3 is provided with two screw holes 32a and 32b that are formed at two corner portions of the bottom face 32, which are in a diagonal relationship. The screw holes 32a and 32b and the hole portions 21a and 21b formed on the first rigid substrate 21 are made to face each other and are screw-coupled with screws 81 and 82, and thereby the first rigid substrate 21 is fixed to the bottom face 32 as shown in FIGS. 7A and 7B. In addition, protruding portions may be provided instead of the screw holes 32a and 32b, and the protruding portions and the hole portions 21a and 21b may engage with each other to perform the fixing.

In addition, the supporting member 3 is provided with a penetration hole 37 that penetrates through the top face 31 and the bottom face 32. In a state in which the first rigid substrate 21 is fixed to the bottom face 32, the first power supply circuit 431, the amplifying circuit 44, and the analog/digital converting circuit 45 that are mounted on the front-side mounting face 211 are accommodated in the penetration hole 37. That is, the penetration hole 37 functions as an accommodation space of the angular velocity sensor 413 and the acceleration sensor 42, and therefore contributes to the reduction in size and thickness of the module. In addition, the penetration hole 37 makes up a relief portion that prevents the supporting member 3, and the first power supply circuit 431, the amplifying circuit 44, and the analog/digital converting circuit 45 from being brought into contact with each other. When this penetration hole 37 is formed, the inner space of the supporting member 3 may be effectively utilized and therefore a reduction in the size (reduction in thickness) of the module 1 may be promoted.

Top Face 31

The top face 31 makes up a fixing face that fixes the second rigid substrate 22. The second rigid substrate 22 is fixed to the top face 31 in a state in which the front-side mounting face 221 faces the supporting member 3 side (inner side). Specifically, the supporting member 3 is provided with two screw holes 31a and 31b that are formed at two corner portions of the top face 31, which are in a diagonal relationship. These screw holes 31a and 31b are formed to be opposite to the screw holes 32a and 32b that are formed in the bottom face 32. The screw holes 31a and 31b and the hole portions 22a and 22b formed in the second rigid substrate 22 are made to face each other and are screw-coupled with screws 83 and 84, and thereby the second rigid substrate 22 is fixed to the top face 31 as shown in FIGS. 7A and 7B.

In addition, as described above, the supporting member 3 is provided with the penetration hole 37. In a state in which the second rigid substrate 22 is fixed to the top face 31, the microcontroller 46 mounted on the front-side mounting face 221 is accommodated in the penetration hole 37. That is, the penetration hole 37 also functions as a relief portion that prevents the supporting member 3 and the microcontroller 46 from being brought into contact with each other. When the penetration hole 37 is formed, an inner space of the supporting member 3 may be effectively used, and therefore the reduction in size (reduction in thickness) of the module 1 may be promoted.

In addition, two penetration holes 381 and 382 that penetrate through the top face 31 and the bottom face 32 at edge portion thereof are formed in the supporting member 3. These two penetration holes 381 and 382 are formed so as to penetrate through two corner portions of the top face 31, which are in a diagonal relationship and in which the screw holes 31a and 31b are not formed, and corner portions of the bottom face 32, which correspond to the two corner portions. As described later, these penetration holes 381 and 382 are screw holes to which a screw is inserted when the supporting member 3 is screw-coupled to the base 7.

In addition, a constituent material of the supporting member 3 is not particularly limited, but for example, a hard material is preferable so as to prevent deformation from occurring when a pressure is applied from the outside. According to this configuration, a state in which the bottom face 32, the side face 33, and the side face 34 are orthogonal to each other may be reliably maintained and therefore the detection accuracy of the module 1 may be maintained to be high.

This material is not particularly limited, but as this material, various kinds of metal such as iron, nickel, copper, and aluminum, or alloys or intermetallic compounds containing at least one kind from among these kinds of metal, or oxides of these kinds of metal may be exemplified. For example, as the alloys, stainless steel, inconel, and in addition thereto, for example, various aluminum-based alloys such as duralumin may be exemplified.

In this manner, when the supporting member 3 is formed of the metallic material, the following effect may be exhibited. That is, when the supporting member 3 is formed of a material having a high electrical conductivity like a metallic material, for example, radiation noise generated from a microcontroller 46 may be blocked by the supporting member 3. Therefore, it is possible to prevent this radiation noise from reaching the angular velocity sensors 412 and 413 in the concave portions 331 and 341 and having an adverse effect on the sensors. As a result, the angular velocity may be detected by the angular velocity sensors 412 and 413 with high accuracy.

In addition, as the hard material, in addition to the metallic materials, for example, polyolefin such as polyethylene, polypropylene, and ethylene-propylene copolymer, polyester such as polyvinyl chloride, polystyrene, polyamide, polyimide, polycarbonate, poly-(4-methyl pentene-1), ionomer, an acrylic resin, polymethyl methacrylate, acrylonitrile-butadiene-styrene copolymer (ABS resin), acrylonitrile-styrene copolymer (AS resin), butadiene-styrene copolymer, polyethylene terephthalate (PET), and polybutylene terephthalate (PBT), polyether, polyether ketone (PEK), polyether ether ketone (PEEK), polyether imide, polyacetal (POM), polyphenylene oxide, polysulfone, polyether sulfone, polyphenylene sulfide, polyarylate, aromatic polyester (liquid crystal polymer), polytetrafluoroethylene, polyvinylidene fluoride, and in addition to these, a fluorine-based resin, an epoxy resin, a phenol resin, a urea resin, a melamine resin, a silicone resin, polyurethane, or the like, or copolymers, blends, polymer alloys, and the like, which contain these as a main component, may be exemplified, and one kind or two or more kinds of these may be combined to be used.

In addition, as the constituent material of the supporting member 3, an elastic material that is capable of exhibiting a vibration-proof and vibration isolating function that absorbs unnecessary vibration is preferable. As this material, for example, various rubber materials (particularly, vulcanized rubber) such as natural rubber, isoprene rubber, butadiene rubber, styrene-butadiene rubber, nitrile rubber, chloroprene rubber, butyl rubber, acrylic rubber, ethylene-propylene rubber, silicone rubber, and fluoro-rubber, various kinds of thermoplastic elastomer such as styrene series, polyolefin series, polyvinyl chloride series, polyurethane series, polyester series, polyamide series, polybutadiene series, trans-polyisoprene series, fluoro-rubber series, and chlorinated polyethylene series may be exemplified, and one kind or two or more kinds of these may be combined to be used.

In addition, as the constituent material of the supporting member 3, vibration-isolating steel is preferably used so as to make an anti-deformation property and the vibration-proofing and vibration-isolating functions be compatible with each other.

Since this supporting member 3 is provided with three faces that are orthogonal to each other, that is, the bottom face 32, the side face 33, and the side face 34, the three angular velocity sensors 411 to 413 may be disposed to be orthogonal to each other in a simple and reliable manner only by fixing the first rigid substrate 21 on which the angular velocity sensor 411 is mounted to the bottom face 32, by fixing the third rigid substrate 23 on which the angular velocity sensor 412 is mounted to the side face 33, and by fixing the fourth rigid substrate 24 on which the angular velocity sensor 413 is mounted to the side face 34. That is, the three angular velocity sensors 411 to 413 may be disposed in a manner such that a detection axis A1 of the angular velocity sensor 411, a detection axis A2 of the angular velocity sensor 412, and a detection axis A3 of the angular velocity sensor 413 are orthogonal to each other. Therefore, the angular velocity detection accuracy of the module 1 may be improved in a simple manner.

In addition, the angular velocity sensors 412 and 413 are positioned on the supporting member 3 side in relation to the mounting substrate 2. Therefore, the angular velocity sensor 412 is prevented from being exposed to the outside of the module 1 by the third rigid substrate 23, and the angular velocity sensor 413 is prevented from being exposed to the outside of the module 1 by the fourth rigid substrate 24. According to this arrangement, for example, at the time of manufacturing the module 1, or at the time of assembling the module 1 to another electronic apparatus, the angular velocity sensors 412 and 413 do not come into contact with a worker, a manufacturing apparatus, or the like, and therefore these sensors may be effectively prevented from being broken. In addition, as described above, an external magnetic field may be blocked by the ground layer provided to the mounting substrate 2, such that the angular velocity may be detected by the sensors with good accuracy while the angular velocity sensors 412 and 413 are not affected by the magnetic field.

Casing

As shown in FIGS. 1A and 1B, the casing (maintaining member) 6 includes the base 7 to which the supporting member 3 is fixed, and the cover member (cap) 10 that covers the supporting member 3 fixed to the base 7. Hereinafter, the base 7 and the cover member 10 will be sequentially described.

Base 7

As shown in FIG. 8, the base 7 is a plate-shaped member, and has a substantially rectangular shape in plan view. In this manner, when the base 7 is made to have the substantially rectangular shape in plan view, it is easy to confirm the respective axes of x-axis, y-axis, and z-axis (the detection axes A1 to A3 of the angular velocity sensors 411 to 413) from the outside of the module 1, and when the module 1 is mounted on an object (not shown) (for example, a circuit board on the electronic apparatus side) or the like, the mounting (positioning) of the module 1 may be easy.

In addition, the bottom face of the base 7 is parallel to the xy plane (a plane made by the x-axis and y-axis). Therefore, when the module 1 is mounted on the object, a mounting face of the object becomes parallel to the xy plane. As a result, for example, in an electronic apparatus 500 described later or the like, arrangement of the object may be easily performed, and therefore the angular velocity around the respective axes may be detected by the module 1 in a relatively exact manner.

In addition, elongated holes 711 and 712 that are opened to the outer periphery (outer edge) are formed at two corner portions of the base 7, which are positioned in a diagonal relationship, respectively. These elongated holes 711 and 712 extend in the same direction as each other. These elongated holes 711 and 712 are screw holes to fix the module 1 to the object. That is, the elongated holes 711 and 712 make up a fixing portion that fixes the module 1 to the object. When the module 1 is screw-coupled to the object using the elongated holes 711 and 712, the module 1 may be fixed to the object in a simple and reliable manner.

Here, when one of the elongated holes 711 and 712 is in a state of being temporarily fixed to the object with a screw, the module 1 may be made to rotate around the z-axis on the object with the screw made as the center of the rotational movement. Therefore, first, the module 1 is temporarily fixed (screw-coupled) using one elongated hole, and then the positioning of the module 1 around the z-axis is performed, and then the other elongated hole is screw-coupled, and finally both screws are tightened, and thereby the module 1 may be fixed to the object in a state in which the module 1 is positioned around the z-axis with good accuracy.

In addition, in a state in which the module 1 is temporarily fixed to the object using the elongated holes 711 and 712, the module 1 may be made to slide with respect to the object in an extension direction of the elongated holes 711 and 712. Therefore, the position of the module 1 in the x-axis direction and the y-axis direction may be minutely adjusted with respect to the object. As a result, the positioning of the module 1 with respect to the object may be performed with good accuracy.

In addition, the base 7 is provided with a concave portion 72, which is opened, at a central portion of the top face excluding an edge portion. The concave portion 72 functions as an accommodation portion that accommodates the angular velocity sensor 411 and the acceleration sensor 42 that are mounted on the rear-side mounting face 212 of the first rigid substrate 21, in a state in which the supporting member 3 is fixed to the base 7. In other words, the concave portion 72 makes up a relief portion that prevents the base 7, and the angular velocity sensor 411 and the acceleration sensor 42 from being brought into contact with each other. When this concave portion 72 is formed, the space of the base 7 may be effectively utilized and therefore the reduction in size (reduction in thickness) of the module 1 may be promoted.

In addition, the base 7 is provided with four alignment portions 741, 742, 743, and 744. These alignment portions 741 to 744 have a function of performing the positioning of the supporting member 3 with respect to the base 7 around the respective axes of x-axis, y-axis, and z-axis. Specifically, the alignment portions 741 to 744 has a function of positioning the supporting member 3 with respect to the base 7 in a manner such that a plane made by the detection axis A2 of the angular velocity sensor 412 and the detection axis A3 of the angular velocity sensor 413 becomes parallel to the xy plane, and the detection axis A1 of the angular velocity sensor 411 becomes parallel to the z-axis.

These four alignment portions 741 to 744 are provided at four corner portions of the concave portion 72, respectively, and protrude from the bottom face of the concave portion 72. In addition, alignment portions 741, 742, 743, and 744 have mounting faces 741a, 742a, 743a, and 744a that are made up by planes parallel to the xy plane, respectively, and these four mounting faces 741a to 744a are positioned to be flush with the xy plane. Therefore, when the supporting member 3 is mounted on these mounting faces 741a to 744a in order for the bottom face 32 to be opposite to the mounting faces, the detection axis A1 of the angular velocity sensor 411 becomes parallel to the z-axis. In this manner, the positioning of the angular velocity sensor 411 around the x-axis and y-axis with respect to the base 7 may be simply performed with good accuracy by only mounting the supporting member 3 on the four alignment portions 741 to 744.

Particularly, as is the case with this embodiment, when the four alignment portions 741 to 744 are provided to the corner portions of the concave portion 72, that is, the four alignment portions 741 to 744 are provided at the edge portions of the concave portion 72 so as to be spaced from each other, the alignment portions 741 to 742 may be spaced greatly apart from each other, and the supporting member 3 may be mounted on the alignment portions 741 to 744 in a relatively stable manner.

In these alignment portions 741 to 744, two alignment portions 742 and 744 that are in a diagonal relationship have screw holes 761 and 762, respectively. The screw holes 761 and 762 are screw holes that fix the supporting member 3 mounted on the base 7 (the mounting faces 741a to 744a) to the base 7. That is, the screw holes 761 and 762 make up a fixing portion that fixes the supporting member 3 to the base 7.

Figure 9A:
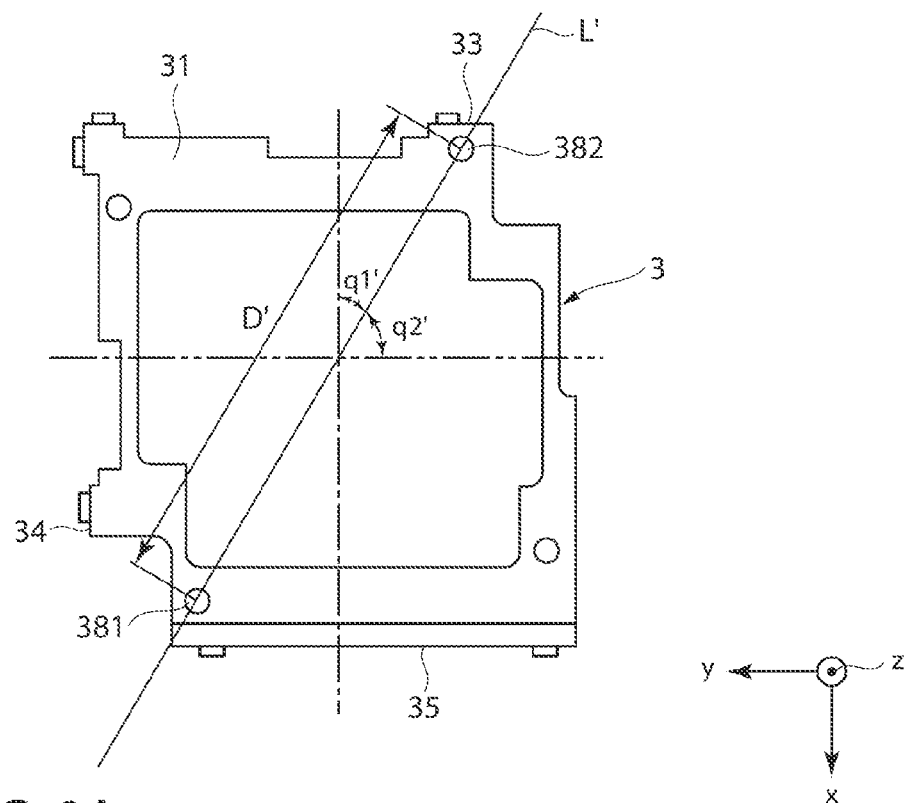
FIGS. 9A and 9B are plan views illustrating the supporting member shown in FIGS. 5A and 5B and the base shown in FIG. 8.
Figure 9B:
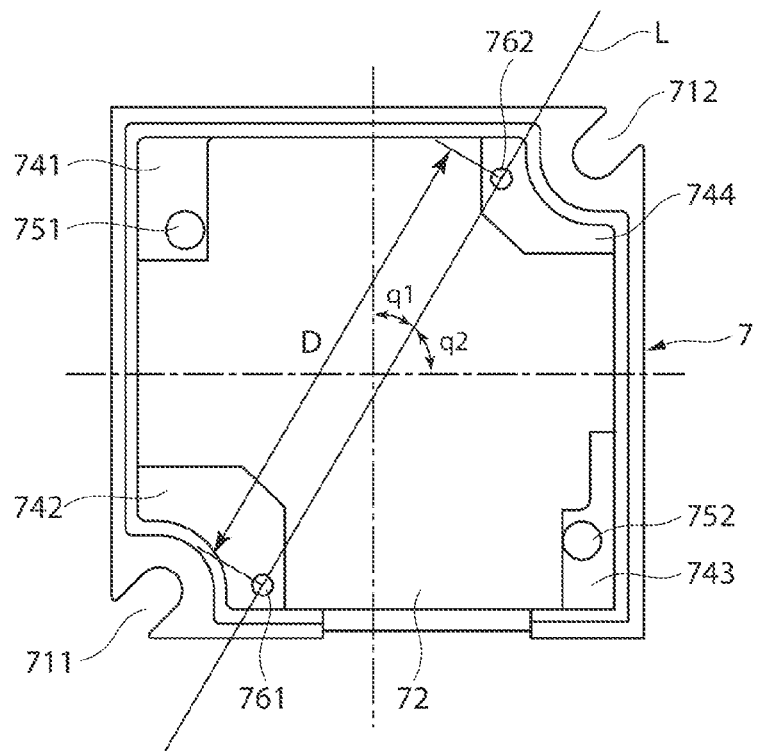

The screw hole 761 is formed to be opened to the mounting face 742a, and the screw hole 762 is formed to be opened to the mounting face 744a. In addition, as shown in FIGS. 9A and 9B, in xy plane view, a distance D between centers of the screw holes 761 and 762 is substantially the same as a distance D' between centers of the penetration holes 381 and 382 of the supporting member 3. In addition, an angle θ1 made by a straight line L connecting centers of the screw holes 761 and 762 and the x-axis is substantially the same as an angle θ1' made by a straight line L' connecting centers (center axes) of the penetration holes 381 and 382 and a face parallel to the side face 34, and an angle θ2 made by the straight line L and the y-axis is substantially the same as an angle □θ2' made by the straight line L' and a face parallel to the side face 33.

Therefore, when the supporting member 3 is mounted on the base 7 (the mounting faces 741a to 744a) in a manner such that the screw hole 761 is opposite to (communicates with) the penetration hole 381, and the screw hole 762 is opposite to (communicates with) the penetration hole 382, the detection axis A2 of the angular velocity sensor 412 fixed to the side face 33 of the supporting member 3 and the x-axis become substantially parallel to each other, and the detection axis A3 of the angular velocity sensor 413 fixed to the side face 34 and the y-axis become substantially parallel to each other. In addition, when screws 85 and 86 are fastened into the screw holes 761 and 762 through the penetration holes 381 and 382, the supporting member 3 is completely fixed to the base 7 while maintaining a state in which the detection axes A1, A2, and A3 of the angular velocity sensors 411, 412, and 413 are parallel to the z-axis, x-axis, and y-axis, respectively (refer to FIG. 1B).

In this manner, according to the base 7, the positioning of the supporting member 3 around the z-axis with respect to the base 7 may be simply performed with good accuracy by only performing positional alignment between the penetration holes 381 and 382, and the screw holes 761 and 762, and performing the fixing. In other words, when the detection axes A1, A2, and A3 of the angular velocity sensors 411, 412, and 413 are not parallel to the z-axis, x-axis, and y-axis, respectively, the supporting member 3 may not be fixed to the base 7, such that the positioning of the supporting member 3 with respect to the base 7 may be performed in a relatively reliable manner. In this manner, the screw holes 761 and 762 are used as fixing portions that fix the supporting member 3 to the base 7, and are used as alignment portions that perform the positioning of the supporting member 3 around the z-axis, and therefore the positioning of the supporting member 3 with respect to the base 7 may be performed in a relatively accurate manner.

In addition, in regard to the fixing of the supporting member 3 to the base 7, adhesion using adhesive may be used together with the screw-coupling. Therefore, since an adhesive layer is interposed between the base 7 and the supporting member 3, unnecessary vibration of the supporting member 3 is suppressed. As a result thereof, the detection accuracy of the angular velocity sensors 411 to 413 or the like may be improved.

In addition, in the alignment portions 741 to 744, the two alignment portions 741 and 743, which are in a diagonal relationship, are provided with concave portions 751 and 752, respectively. The concave portion 751 is formed to be opened to the mounting face 741a, and the concave portion 752 is formed to be opened to the mounting face 743a. These concave portions 751 and 752 makeup a relief portion (accommodation portion) that prevents the base 7 and head portions (heads) of the screws 82 and 81 from being brought into contact with each other at the time of fixing the supporting member 3 to the base 7. Therefore, the concave portions 751 and 752 have a shape and size capable of accommodating the head portions of the screws 82 and 81. When these concave portions 751 and 752 are provided, breakage of the supporting member 3 and the base 7, deformation of the supporting member 3, or the like may be prevented and therefore the reliability of the module 1 is improved.

In addition, the concave portions 751 and 752 also function as a temporary alignment portion that performs the positioning of the supporting member 3 around the z-axis with respect to the base 7. That is, when the supporting member 3 is mounted on the base 7 in a manner such that the head portions of the screws 81 and 82 are accommodated in the concave portions 751 and 752, the positioning of the supporting member 3 around the z-axis with respect to the base 7 may be substantially performed. In addition, in this state, excessive rotational movement of the supporting member 3 around the z-axis is restricted, such that the positional alignment between the screw holes 761 and 762 and the penetration holes 381 and 382 may be simply performed.

It is preferable that the concave portion 751 have a shape capable of regulating movement of the head portion of the screw 81 within the concave portion 751 in the xy plane direction so as to effectively exhibit the function of the temporary alignment portion. This is true of the concave portion 752. According to this configuration, in a state in which the head portions of the screw 81 and 82 are accommodated in the concave portions 751 and 752, respectively, the shaking (rotational movement around the z-axis) of the supporting member 3 is further suppressed, and the above-described temporary positioning of the supporting member 3 may be further effectively performed.

Although not being particularly limited, a material having a vibration damping characteristic is preferable as a constituent material of the base 7. According to this configuration, unnecessary vibration of the supporting member 3 is suppressed and therefore the detection accuracy of the angular velocity sensors 411 to 413 or the like may be improved. As this material, for example, various vibration damping alloys such as a magnesium alloy, an iron-based alloy, a copper alloy, a manganese alloy, and a Ni—Ti based alloy may be exemplified.

Hereinbefore, a description has been made in detail with respect to the configuration of the base 7.

According to this base 7, the supporting member 3 may be simply fixed, and the positioning of the supporting member 3 around the respective axes of x-axis, y-axis, and z-axis with respect to the base 7 may be simply performed with high accuracy. Therefore, the module 1 that is capable of exhibiting excellent detection accuracy may be obtained.

In addition, as described above, in the case of mounting the module 1 on an object, when the positioning of the module 1 around the z-axis with respect to the object is performed with two side faces 7c and 7d of the base 7, which are orthogonal to each other, made as a reference, the detection axes A2 and A3 of the angular velocity sensors 412 and 413 may be made to face a desired direction in a simple manner. Specifically, the side face 7c is a face parallel to the detection axis A3, and the side face 7d is a face parallel to the detection axis A2. Therefore, when the positioning is performed with the side faces 7c and 7d made as a reference, the detection axes A2 and A3 of the angular velocity sensors 412 and 413 may be made to face a desired direction in a simple manner. In addition, the side faces 7c and 7d intersect each other while the elongated holes 711 and 712 are not formed between the side faces 7c and 7d, such that when the positioning is performed with the vicinity of a connection portion between the side faces 7c and 7d made as a reference, the above-described positioning may be performed in a relatively simple and accurate manner.

Cover Member

The cover member 10 is fixed to the base 7 so as to cover the supporting member 3. According to this configuration, the electronic components 4 may be protected. In addition, the cover member 10 has an opening 101 formed in a side face thereof, and in a state in which the cover member 10 is fixed to the base 7, the connector 49 is exposed from the opening 101 to the outside. According to this configuration, electrical connection between an external apparatus and the connector 49 may be easily performed. The method of fixing the base 7 and the cover member 10 is not particularly limited, and fitting, screwing, and bonding with adhesive may be used.

In addition, two corner portions of the cover member 10 are cut out so as not to overlap the elongated holes 711 and 712 formed in the base 7 in xy plan view. Therefore, the fixing of the module 1 to the object (object) may be easily performed.

Although not particularly limited, as a constituent material of the cover member 10, for example, polyolefin such as polyethylene, polypropylene, and ethylene-propylene copolymer, polyester such as polyvinyl chloride, polystyrene, polyamide, polyimide, polycarbonate, poly-(4-methyl pentene-1), ionomer, an acrylic resin, polymethyl methacrylate, acrylonitrile-butadiene-styrene copolymer (ABS resin), acrylonitrile-styrene copolymer (AS resin), butadiene-styrene copolymer, polyethylene terephthalate (PET), and polybutylene terephthalate (PBT), polyether, polyether ketone (PEK), polyether ether ketone (PEEK), polyether imide, polyacetal (POM), polyphenylene oxide, polysulfone, polyether sulfone, polyphenylene sulfide, polyarylate, aromatic polyester (liquid crystal polymer), polytetrafluoroethylene, polyvinylidene fluoride, and in addition to these, a fluorine-based resin, an epoxy resin, a phenol resin, a urea resin, a melamine resin, a silicone resin, polyurethane, or the like, or copolymers, blends, polymer alloys, and the like, which contain these as a main component, may be exemplified, and one kind or two or more kinds of these may be combined to be used.

Hereinbefore, a description has been made with respect to the casing 6.

In the module 1, a filler (molding material) (not shown) is filled in the concave portion 72 of the base 7, and a gap between the concave portion 72 and the first rigid substrate 21 is buried with the filler. The rear-side mounting face 212 (the angular velocity sensor 411 and the acceleration sensor 42) of the first rigid substrate 21 or the connecting portions 261, 262, and 263 that extend from the first rigid substrate 21 are fixed with the filler 9, and therefore unnecessary vibration is effectively prevented from occurring in the first rigid substrate 21. As a result, the detection accuracy of the angular velocity sensors 411 to 413 or the acceleration sensor 42 may be improved.

A material having an insulating property is preferable as a constituent material of the filler. Although not particularly limited, as this material, for example, polyolefin such as polyethylene, polypropylene, and ethylene-propylene copolymer, polyester such as polyvinyl chloride, polystyrene, polyamide, polyimide, polycarbonate, poly-(4-methyl pentene-1), ionomer, an acrylic resin, polymethyl methacrylate, acrylonitrile-butadiene-styrene copolymer (ABS resin), acrylonitrile-styrene copolymer (AS resin), butadiene-styrene copolymer, polyethylene terephthalate (PET), and polybutylene terephthalate (PBT), polyether, polyether ketone (PEK), polyether ether ketone (PEEK), polyether imide, polyacetal (POM), polyphenylene oxide, polysulfone, polyether sulfone, polyphenylene sulfide, polyarylate, aromatic polyester (liquid crystal polymer), polytetrafluoroethylene, polyvinylidene fluoride, and in addition to these, a fluorine-based resin, an epoxy resin, a phenol resin, a urea resin, a melamine resin, a silicone resin, polyurethane, or the like, or copolymers, blends, polymer alloys, and the like, which contain these as a main component, may be exemplified, and one kind or two or more kinds of these may be combined to be used.

Second Embodiment

Next, a second embodiment of the module of the invention will be described.

Figure 10:
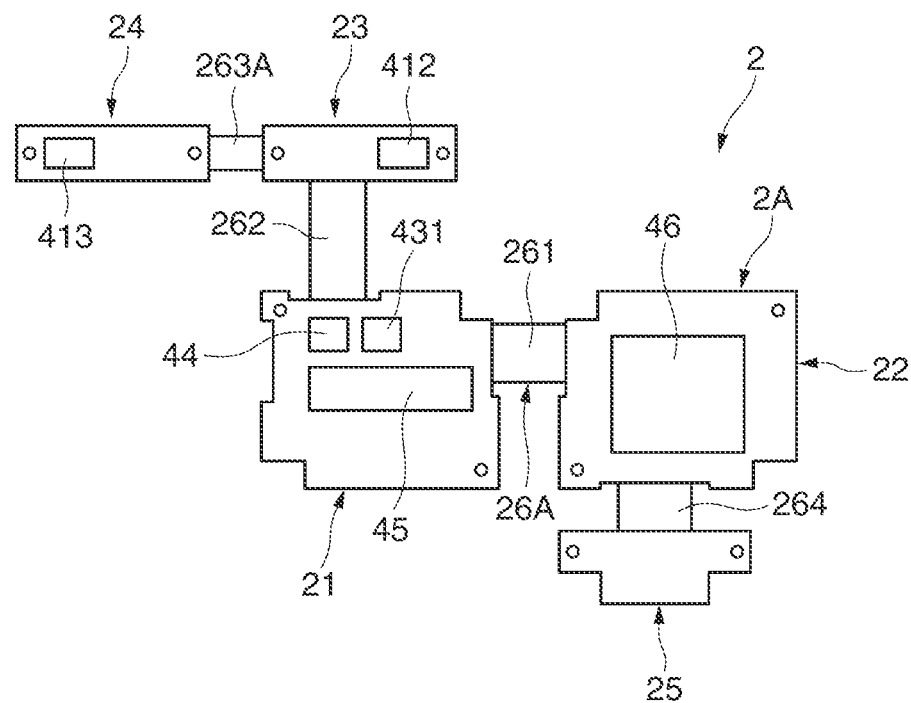
FIG. 10 is a plan view illustrating a mounting substrate provided in a module according to a second embodiment of the invention.

FIG. 10 shows a plan view illustrating a mounting substrate provided to the module according to a second embodiment of the invention.

Hereinafter, the second embodiment will be mainly described based on a difference with the above-described embodiment, and description with respect to substantially the same configuration as the above-described embodiment will not be repeated.

The module according to the second embodiment of the invention is substantially the same as the first embodiment except that a configuration of the mounting substrate is different in each case.

As shown in FIG. 10, a mounting substrate 2A includes a first rigid substrate 21, a second rigid substrate 22, a third rigid substrate 23, a fourth rigid substrate 24, and a fifth rigid substrate 25 that are disposed to be spaced from each other, and a flexible substrate 26A that connects these rigid substrates.

In addition, the flexible substrate 26A includes a first connecting portion 261 that connects the first rigid substrate 21 and the second rigid substrate 22, a second connecting portion 262 that connects the first rigid substrate 21 and the third rigid substrate 23, a third connecting portion 263A that connects the third rigid substrate 23 and the fourth rigid substrate 24, and a fourth connecting portion 264 that connects the second rigid substrate 22 and the fifth rigid substrate 25. The first connecting portion 261, the second connecting portion 262, the third connecting portion 263A, and the fourth connecting portion 264 have flexibility, and therefore bending deformation in a face direction may be easily performed.

Even in the mounting substrate 2 having this configuration, as described in the first embodiment, the mounting substrate 2 may be deformed into a rectangular parallelepiped shape in a manner such that the first rigid substrate 21 makes up the bottom face, the second rigid substrate 22 makes up the top face, the third to fifth rigid substrates 23 to 25 make up side faces, and rigid substrates adjacent to each other are orthogonal to each other.

According to this second embodiment, the same effect as the first embodiment may be exhibited.

2. Electronic Apparatus

Figure 11:
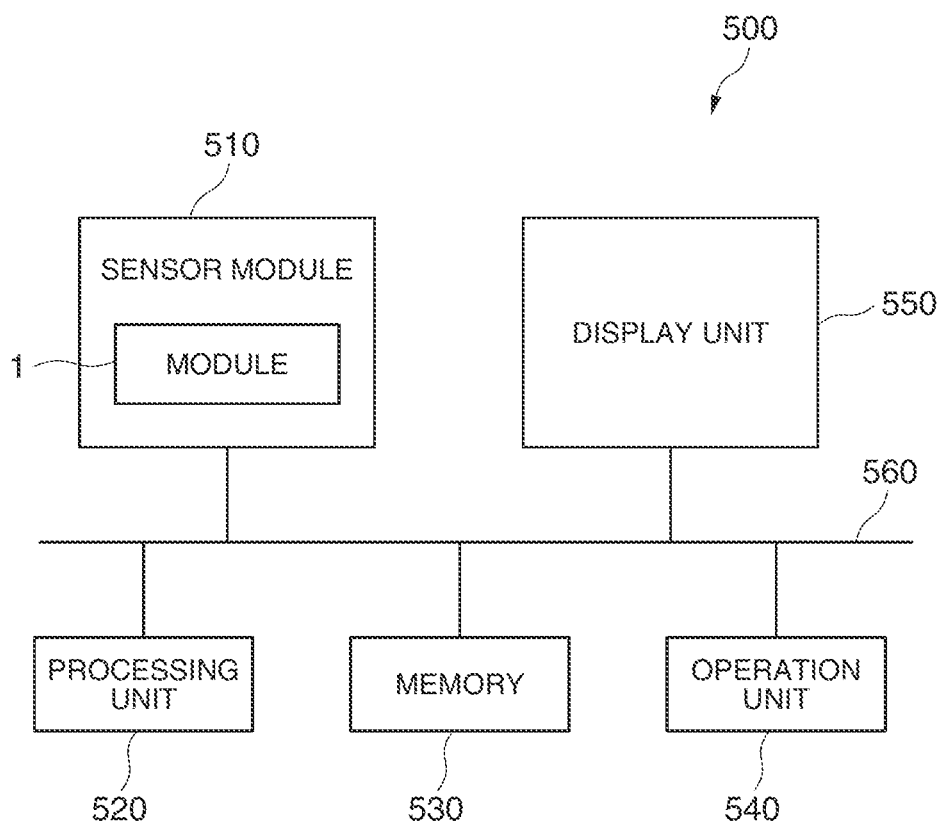
FIG. 11 is a view illustrating an example of a configuration of an electronic apparatus in which a module of the invention is mounted.

The above-described module 1 may be assembled into various electronic apparatus. Hereinafter, an electronic apparatus according to the invention in which the module 1 is mounted will be described. FIG. 11 shows a view illustrating an example of a configuration of an electronic apparatus 500 in which the module 1 is mounted. The electronic apparatus 500 is not particularly limited, and for example, a digital still camera, a video camera, a car navigation system, a cellular phone, a mobile PC, a robot, a gaming machine, a game controller, or the like may be exemplified.

The electronic apparatus 500 shown in FIG. 11 includes a sensor module 510 including the module 1, a processing unit 520, a memory 530, an operation unit 540, and a display portion 550. These are connected to each other by a bus 560. The processing unit (CPU, MPU, or the like) 520 performs a control of the sensor module 510 or the like, or an entire control of the electronic apparatus 500. In addition, the processing unit 520 performs processing on the basis of angular velocity information detected by the sensor module 510. For example, the processing unit 520 performs processing for camera shake correction, a posture control, GPS autonomous navigation, or the like on the basis of the angular velocity information. The memory 530 stores a control program or various pieces of data, and functions as a work area or a data storage area. The operation unit 540 allows a user to operate the electronic apparatus 500. The display unit 550 displays various kinds of information to the user.

Above, a description has been made with respect to the module and electronic apparatus according to the invention on the basis of embodiments shown in the drawings, but the invention is not limited thereto, and configurations of respective portions may be substituted with arbitrary configurations having substantially the same functions.

In addition, in the above-described embodiments, a description has been made with respect to a configuration in which three angular velocity sensors are mounted on the mounting substrate, but the number of the angular velocity sensors is not limited to this, and may be one or two. In addition, the number of the rigid substrates may be changed in response to the number of the angular velocity sensors.

In addition, in the above described embodiments, a description has been made with respect to a configuration in which the rigid and flexible substrate is used as the mounting substrate, but a flexible substrate may also be used as the mounting substrate.

What is claimed is:

1. A module comprising:
   a first substrate that includes a first sensor device;
   a second substrate that includes a second sensor device, the first substrate including an electronic component which is electrically connected to the first sensor device and the second sensor device;
   a third substrate that includes a third sensor device;
   a fourth substrate that includes a digital circuit which is electrically connected to the electronic component;
   a first connecting portion that connects the first substrate and the second substrate, and the first connecting portion being flexible;
   a second connecting portion that connects the first substrate and the third substrate, and the second connecting portion being flexible;
   a third connecting portion that connects the first substrate and the fourth substrate, and the third connecting portion being flexible; and
   a supporting member that has a plurality of fixing faces,
   wherein the first substrate has a first cut-out portion, and the first connecting portion connects to the first substrate within the first cut-out portion,
   the first substrate has a second cut-out portion, and the second connecting portion extends from the second cut-out portion,
   the first substrate has a third cut-out portion, and the third connecting portion extends from the third cut-out portion,
   the second substrate has a fourth cut-out portion, and the first connecting portion extends from the fourth cut-out portion, and
   the first substrate, the second substrate, the third substrate, and the fourth substrate each include apertures that mate with projections formed on the fixing faces of the supporting member when the first, second, and third connecting members are each bent to mate the first, second, third, and fourth substrates with the fixing faces, respectively, and the first substrate and the second substrate are arranged horizontally in parallel with each other when attached to one of the fixing faces, respectively, the third and fourth substrates are arranged vertically and orthogonal to each other when attached to one of the fixing faces, respectively, and the first and second substrates are arranged orthogonal to each of the third and fourth substrates when attached to one of the fixing faces, respectively.

2. The module according to claim 1, wherein the first substrate, the second substrate, and the third substrate are disposed to be orthogonal to each other.

3. The module according to claim 1, wherein detection axes of the first sensor device, the second sensor device, and the third sensor device are orthogonal to each other.

4. The module according to claim 1, further comprising:

a fifth substrate that includes a connector for an interface; and a fourth connecting portion that connects the second substrate and the fifth substrate so as to electrically connect the digital circuit and the connector.

5. The module according to claim 1, wherein the electronic component includes at least one of a power supply circuit, an amplifying circuit, and an analog/digital converting circuit, and the digital circuit includes a microcontroller.

6. An electronic apparatus comprising:

the module according to claim 1.

7. The module according to claim 1, wherein a first end of the first connecting portion extends from the first cut-out portion, and a second, opposite end of the first connecting portion extends from the fourth cut-out portion.

8. The module of claim 1, wherein the second substrate has a second cut-out portion, wherein a first end of the first connecting portion extends from the first cut-out portion, and a second opposite end of the first connecting portion extends from the second cut-out portion.

* * * * *